United States Patent
Balaz et al.

(10) Patent No.: US 8,506,005 B2
(45) Date of Patent: Aug. 13, 2013

(54) TRAILER FLOOR HAVING EXTRUDED PANELS

(75) Inventors: Richard M. Balaz, Oakville (CA); William A. Willsher, Stoney Creek (CA); Emad Fakhry Habib Assaad, Mississauga (CA)

(73) Assignee: Samuel, Son & Co., Limited, Mississauga, Ontario (CA)

( * ) Notice: Subject to any disclaimer, the term of this patent is extended or adjusted under 35 U.S.C. 154(b) by 263 days.

(21) Appl. No.: 12/916,495

(22) Filed: Oct. 30, 2010

(65) Prior Publication Data

US 2012/0104796 A1    May 3, 2012

(51) Int. Cl.
   *B62D 25/20* (2006.01)
(52) U.S. Cl.
   USPC ............... 296/184.1; 296/193.04; 296/193.07
(58) Field of Classification Search
   USPC ................. 296/184.1, 186.1, 193.04, 193.07; 105/422
   See application file for complete search history.

(56) References Cited

U.S. PATENT DOCUMENTS

| | | | | | |
|---|---|---|---|---|---|
| 2,907,417 | A | * | 10/1959 | Doerr | 52/377 |
| 3,877,671 | A | * | 4/1975 | Underwood et al. | 248/346.03 |
| 4,144,690 | A | * | 3/1979 | Avery | 52/376 |
| 6,109,684 | A | * | 8/2000 | Reitnouer | 296/184.1 |
| 6,669,271 | B2 | | 12/2003 | Booher | |
| 6,929,311 | B2 | | 8/2005 | Booher | |
| 7,152,909 | B2 | | 12/2006 | Booher | |
| 7,267,393 | B2 | | 9/2007 | Booher | |
| 7,390,053 | B2 | | 6/2008 | Booher | |
| 2007/0102961 | A1 | * | 5/2007 | Lemmons | 296/186.1 |
| 2008/0122254 | A1 | * | 5/2008 | Booher | 296/186.1 |
| 2008/0258500 | A1 | | 10/2008 | Booher | |
| 2010/0101478 | A1 | | 4/2010 | Bianchi et al. | |

* cited by examiner

*Primary Examiner* — Jason S Morrow
(74) *Attorney, Agent, or Firm* — Hodgson Russ LLP

(57) ABSTRACT

A trailer floor assembly includes a pair of longitudinally extending side rails supporting a plurality of self-mating transverse panels. The plurality of transverse panels includes extruded aluminum panels interspersed with roll-formed steel panels at locations where extra strength is desired (e.g., king pin, landing dollies, and rear door). The extruded panels include T-shaped slots in a bottom wall thereof to allow the extruded panels to be fastened to the side rails by fasteners engaging the bottom wall of the panel but not the top wall the panel. The assembly eliminates transverse cross-beams used to support longitudinal panels in the prior art, and thereby provides improved aerodynamics.

20 Claims, 3 Drawing Sheets

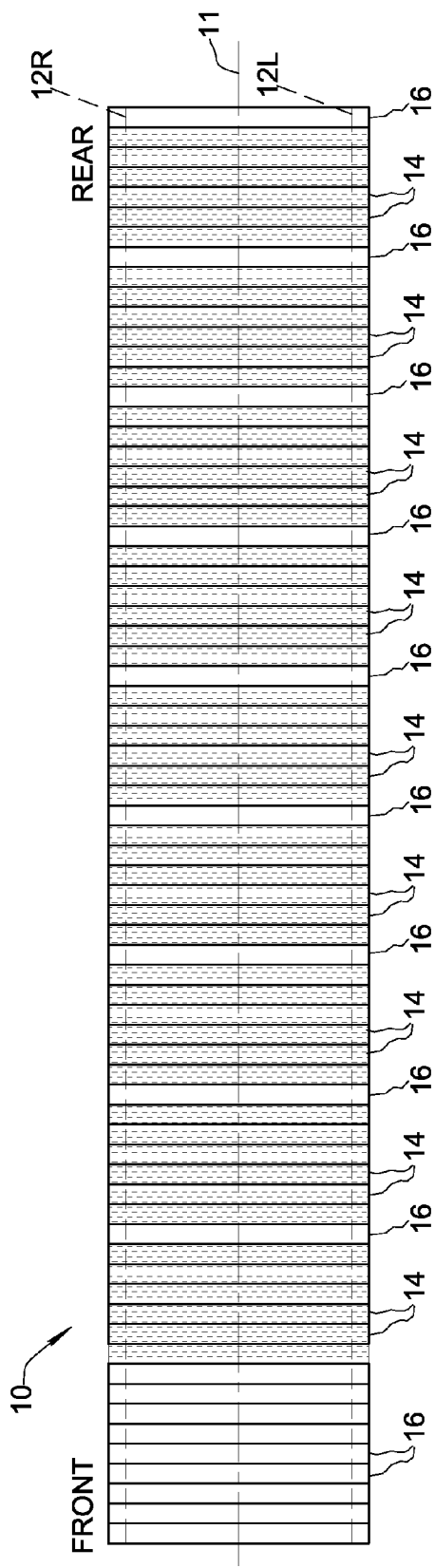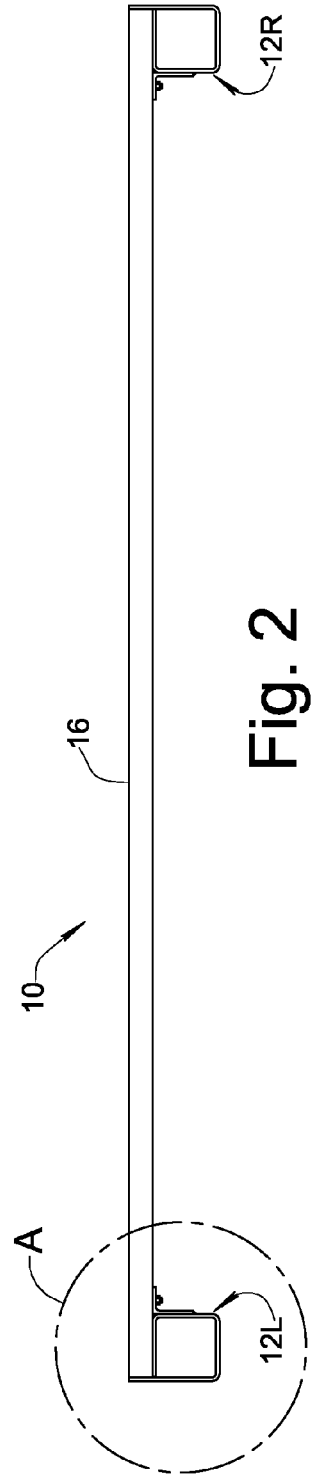

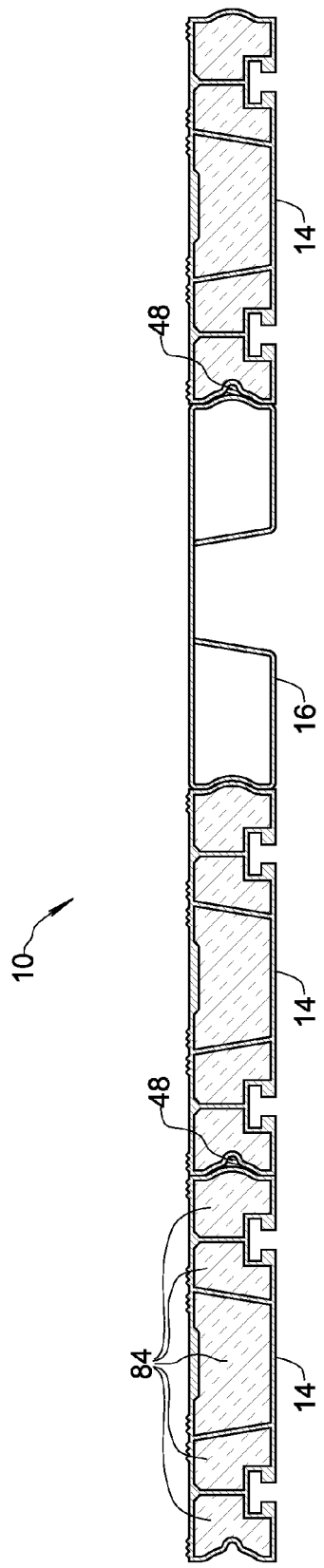

TRAILER FLOOR HAVING EXTRUDED PANELS

FIELD OF THE INVENTION

The invention relates generally to truck trailer bodies, and more particularly to an improved construction for the floor of a trailer utilizing extruded panels that may be extruded from aluminum.

BACKGROUND OF THE INVENTION

In conventional trailer floor assemblies, cross-members arranged transverse to the longitudinal axis of the trailer at spaced intervals along the length of the trailer support a plurality of overlaid plates or sheets typically fabricated of steel or aluminum. The cross-members, usually embodied as structural steel I-beams, are exposed on the underside of the trailer so as to create an undulating exterior surface with troughs between the cross-members. This increases wind drag and acts to collect dirt, ice and snow, road salt, asphalt and other materials, some of which are corrosive. The collected matter increases weight, further increases wind drag, and is a danger to trailing drivers when it dislodges.

To address this problem, U.S. Pat. No. 7,152,909 discloses a trailer floor constructed of a series of extruded aluminum panels arranged to extend transversely between left and right rails running along the length of the trailer. The rails are also extruded aluminum, and each rail defines a U-shaped channel that is open toward the center of the trailer for receiving left or right ends of the floor panels, as the case may be. As may be seen at FIGS. 6, and 7 of the '909 patent, the floor panels have top and bottom walls connected by a pair opposing side walls and by at least one vertical I-beam member located between the side walls. The floor panels include a rib projecting outward from one side wall and a groove along the out surface of the opposite side wall, whereby adjacent floor panels may be mated with one another as shown in FIG. 6A. Each corner of the floor panel extrusion includes a step or half-groove that cooperates with the step or half-groove on an adjacent floor panel to form a grove to receive welding material or an adhesive.

In the solution offered by the '909 patent, the floor panels are supported by a bottom horizontal leg portion of the U-shaped channel, which is a relatively thin aluminum wall projecting from the rest of the rail extrusion. This support arrangement may be too weak and not suitable in areas of high stress (e.g., king pin, landing dollies, and rear door), or in situations where the cargo load carried by the trailer is heavy and/or concentrated away from supported regions of the trailer floor.

What is needed is an improved trailer floor assembly that is stronger, particularly in areas of high stress (e.g., king pin, landing dollies, and rear door), and does not require welding or application of adhesive to join adjacent panels together during assembly. The trailer floor assembly should exhibit better aerodynamics and have a long useful life even when used on snowy and salt-covered roadways.

SUMMARY OF THE INVENTION

The present invention meets the above described needs, and furnishes other improvements. The invention provides a trailer floor assembly comprising a left side rail and a right side rail extending parallel to a longitudinal axis of the trailer floor assembly, and a plurality of extruded metal panels supported by and extending transversely between the left and right side rails. The extruded metal panels may be formed of aluminum for a combination of light weight combined and strength.

The left and right side rails may include a generally rectangular tube member and a right-angle member fixed to an inner vertical wall of the tube member. Each tube member may be roll-formed from metal to include an outer vertical wall greater in height than the inner vertical wall.

Each of the plurality of extruded metal panels has a top wall and a bottom wall connected by a front wall and a rear wall, and is attached to the left and right side rails by fasteners engaging the bottom wall of the panel but not the top wall of the panel. In an embodiment of the invention, the bottom wall of each extruded metal panel includes at least one T-shaped slot for receiving the fasteners. Each T-shaped slot defines a pair of upwardly facing shoulder surfaces engaged by fasteners. The fasteners may also engage a horizontal leg of the right angle member of each side rail.

The trailer floor assembly may further comprise at least one roll-formed steel panel interspersed with the plurality of extruded aluminum panels. For example, a roll-formed steel panel may be provided at a rear end of the trailer floor assembly, a plurality of adjacent roll-formed steel panels may be provided at a front end of the trailer floor assembly, and roll-formed steel panels situated between extruded aluminum panels along the length of the trailer floor assembly. In this regard, the word "interspersed" is used in a broad sense and does not require that a roll-formed panel be directly adjacent to an extruded panel or between two extruded panels, but merely that the trailer floor assembly includes both types of panels.

The front wall and rear wall of the extruded and roll-formed panels may be configured to include complementary curved portions, whereby the front wall of one panel mates with the rear wall of an adjacent panel. One of the complementary curved portions may have a recess for defining a gap between the front and rear walls of adjacent panels so that sealant or epoxy may be injected into the gap. The extruded panels may be provided with partitions connecting the top wall and the bottom wall, wherein a plurality of internal compartments are defined. The internal compartments may be filled with foam insulating material.

BRIEF DESCRIPTION OF THE DRAWING VIEWS

The invention will be explained further with reference to drawing figures in which:

FIG. 1 is a top plan view of a trailer floor assembly formed in accordance with an embodiment of the present invention;

FIG. 2 is a rear end view of the trailer floor assembly shown in FIG. 1;

FIG. 6 is a cross-sectional view showing mated floor panels of the trailer floor assembly.

DETAILED DESCRIPTION OF THE INVENTION

Figure 3:
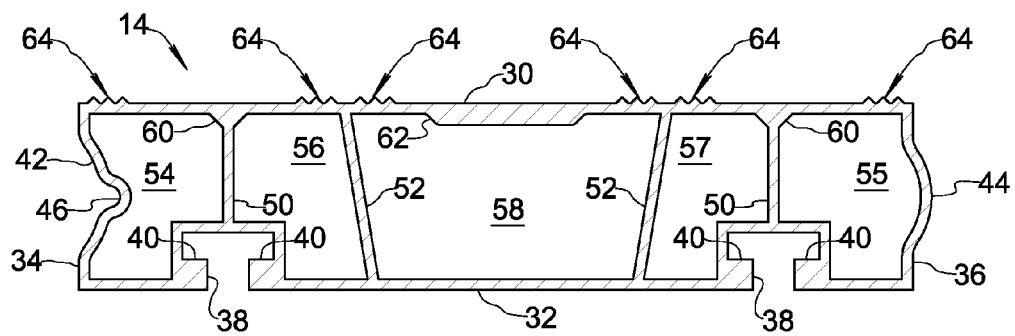
FIG. 3 is a cross-sectional view of an extruded metal floor panel used in the trailer floor assembly of FIG. 1.

FIGS. 1 and 2 depict a trailer floor assembly 10 formed in accordance with an embodiment of the present invention.

Trailer floor assembly 10 comprises a left side rail 12L and a right side rail 12R extending parallel to a longitudinal axis 11 of the trailer floor assembly. The trailer floor assembly 10 also comprises a plurality of extruded metal panels 14 supported by and extending transversely between left side rail 12L and right side rail 12R. Assembly 10 may further comprise at least one roll-formed steel panel 16 interspersed with the plurality of extruded metal panels 14. In the embodiment illustrated in FIG. 1, trailer floor assembly 10 has a roll-formed steel panel 16 at a rear end of the trailer floor assembly, a plurality of adjacent roll-formed steel panels 16 at a front end of the trailer floor assembly, and several roll-formed steel panels 16 at intervals between the front and rear ends of the trailer floor. The steel panels 16 provide greater strength over the king pin region at the front of the trailer, at landing dolly positions along the trailer, and at the rear door area of the trailer.

Figure 5:
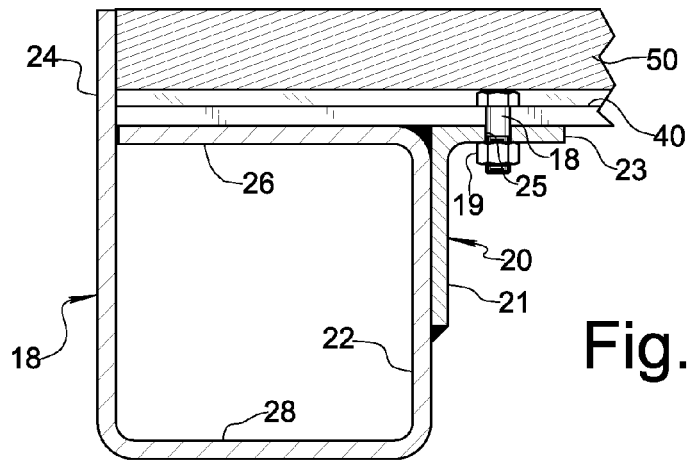
FIG. 5 is an enlarged cross-sectional view illustrating how an extruded aluminum floor panel is fastened to a supporting side rail in the trailer floor assembly.

As best seen in FIGS. 2 and 5, each of the left and right side rails 12L, 12R may include a generally rectangular tube member 18 and a right-angle member 20 fixed to an inner vertical wall 22 of tube member 18, for example by welding and/or fasteners. Generally rectangular tube member 18 also includes an outer vertical wall 24 greater in height than inner vertical wall 22, a horizontal top wall 26, and a horizontal bottom wall 28. Tube member 18 may be roll-formed from steel sheet material. Right-angle member 20 may be a standard size structural steel member having a vertical leg 21 arranged in surface-to-surface engagement against vertical wall 22 of tube member 18 and a horizontal leg 23 arranged such that its upwardly facing surface is flush (coplanar) with an upwardly facing surface of top wall 26 of tube member 18. The height of panels 14 and 16 may be chosen to correspond with the differential height of outer vertical wall 24 above horizontal top wall 26 such that the open side ends of the panels are closed by outer vertical wall 24 in the assembly as depicted in FIG. 5.

FIG. 3 is a cross-sectional view of an extruded metal panel 14 according to an embodiment of the present invention. Metal panel 14 may be extruded from aluminum, which provides good strength yet is lightweight relative to steel. Panel 14 comprises a monolithic body having a top wall 30 and a bottom wall 32 connected by a front wall 34 and a rear wall 36. While panel 14 is elongated in a direction normal to the drawing sheet of FIG. 3, the walls 34 and 36 are referred to herein as front and rear walls, rather than side walls, to indicate the direction that each wall faces with respect to assembly 10 as a whole. It is noted that panel 14 could be reversed such that front wall 34 would become the rear wall (the wall facing the rear of trailer floor assembly 10) and rear wall 36 would become the front wall (the wall facing the front of trailer floor assembly 10) without straying from the invention. The cross-section of panel 14 is constant along its entire length from the left end of the panel to the right end of the panel.

The bottom wall 32 of each extruded metal panel 14 includes at least one T-shaped slot 38 for receiving fasteners to attach the left and right ends of each panel 14 to the left and right side rails 12L, 12R, respectively. In the present embodiment, exactly two T-shaped slots 38 are provided. Each T-shaped slot 38 defines a pair of upwardly facing shoulder surfaces 40. As may be understood from FIG. 5, the fasteners may each be comprised of a bolt 18 and mating nut 19, wherein the bolt 18 is inserted into the slot from the open left or right end of panel 14 such that the enlarged head of the bolt engages shoulder surfaces 40 when nut 19 is tightened onto a threaded end of the bolt arranged to extend through a hole 25 provided in horizontal leg 23 of right-angle member 20. In this way, the left and right ends of panel 14 may be attached to side rails 12L, 12R by fasteners engaging the bottom wall 32 of panel 14 but not the top wall 30 of panel 14.

Front wall 34 and rear wall 36 of each panel 14 may be configured to include complementary curved portions 42 and 44, whereby the front wall 34 of one panel mates with the rear wall 36 of an adjacent panel as illustrated in FIG. 6. One of the complementary curved portions 42, 44 may have a recess for defining a gap between the front and rear walls 34, 36 of adjacent metal panels 14. In the embodiment shown in FIG. 3, curved portion 42 associated with front wall 34 has such a recess 46. As shown in FIG. 6, the gap between front and rear walls 34, 36 of adjacent panels may be injected with sealant or epoxy 48 to keep water out and prevent dissimilar metal corrosion where aluminum and steel panels are arranged adjacent one another as described below.

Figure 4:
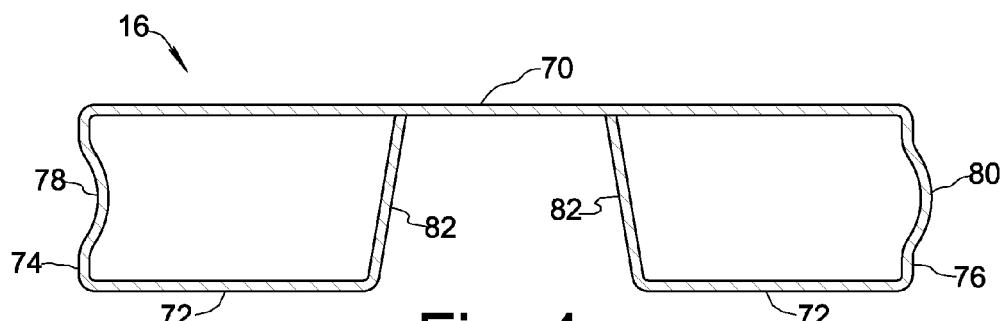
FIG. 4 is a cross-sectional view of a roll-formed steel floor panel known from the prior art and incorporated into the trailer floor assembly of FIG. 1.

Complimentary curved portions 42, 44 of front and rear walls 34, 36 may be configured to enable extruded panels 14 to mate with adjacent roll-formed steel panels 16 in addition to other extruded panels 14. FIG. 4 shows a roll-formed steel panel 16, which is known in the prior art in connection with railcar flooring as evidenced by U.S. Pat. No. 6,973,881, the entire disclosure of which is incorporated herein by reference. Roll-formed panel 16 is shown as including a top wall 70, a pair of bottom walls 72, a front wall 74 connecting one of the pair of bottom walls 72 to the top wall, and a rear wall 76 connecting the other bottom wall 72 to the top wall. Panel 16 further includes a pair of inner support walls 82 extending almost vertically from respective bottom walls 72. Front wall 74 and rear wall 76 include complementary curved portions 78, 80 having the same size and curvature as complimentary curved portions 42, 44. As may be understood from FIG. 6, this allows the front wall 34 of an extruded panel 14 to mate with the rear wall 76 of an adjacent roll-formed panel 16, and the rear wall 36 of an extruded panel 14 to mate with the front wall 74 of an adjacent roll-formed panel 16. As may be appreciated, it is desirable to configure extruded panels 14 to have the same overall height as roll-formed panels 16. In order to attach roll-formed steel panel 16 to side rails 12L and 12R, it is necessary to drill holes through bottom walls 72 to accommodate the fastener elements, i.e. bolt 18 and nut 19.

Extruded panels 14 may further include at least one internal partition connecting top wall 30 and bottom wall 32, wherein a plurality of internal compartments are defined. In the embodiment of FIG. 3, panel 14 has exactly four partitions cooperating with the front and rear walls 34, 36 to define exactly five internal compartments. In the exemplary embodiment of FIG. 3, panel 14 has a pair of vertical partitions 50 centered one above each T-shaped slot 38, and another pair of inclined partitions 52 in the region between vertical partitions 50. Partitions 50 cooperate with front wall 34 and rear wall 36, respectively, to define internal compartments 54 and 55. Partitions 50 also cooperate with respective adjacent partitions 52 to define internal compartments 56 and 57. Partitions 50 cooperate with each other to define a central internal compartment 58. In an embodiment of the invention, one or more of the internal compartments 54, 55, 56, 57, and 58 may be filled with foam insulating material 84 as shown in FIG. 6

Other features of extruded panels 14 may prove advantageous. For example, top wall 30 of extruded panel 14 may include a plurality of striations 64 on an upper surface thereof to help prevent slipping. For improving strength under loading, reinforced regions 60 may be provided where partitions 50 join with an underside of top wall 30. Top wall 30 may also include a central reinforced region 62 between partitions 52.

As will be appreciated, panels 14 and 16 are self-mating and do not require welding. The T-shaped slots of panel 14 remove the need to drill fastener holes for use in attaching the panel to the side rails 12L, 12R. The trailer floor assembly 10 of the present invention decreases wind drag and reduces deposits of dirt, salt and debris by eliminating cross-beams and the undulating undersurface associated with the cross-beam construction of prior art floor assemblies.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

What is claimed is:

1. A trailer floor assembly comprising:
    a left side rail and a right side rail extending parallel to a longitudinal axis of the trailer floor assembly;
    a plurality of extruded metal panels supported by and extending transversely between the left and right side rails, each of the plurality of extruded metal panels having a top wall and a bottom wall connected by a front wall and a rear wall;
    wherein each of the plurality of extruded metal panels is attached to the left and right side rails by fasteners engaging the bottom wall of such panel but not the top wall of such panel; and
    at least one roll-formed steel panel interspersed with the plurality of extruded metal panels.

2. The trailer floor assembly according to claim 1, wherein the bottom wall of each of the plurality of extruded metal panels includes at least one T-shaped slot for receiving the fasteners, the T-shaped slot defining a pair of upwardly facing shoulder surfaces engaged by the fasteners.

3. The trailer floor assembly according to claim 1, wherein each of the left and right side rails includes a generally rectangular tube member and a right-angle member fixed to an inner vertical wall of the tube member.

4. The trailer floor assembly according to claim 3, wherein the generally rectangular tube member is roll-formed metal and includes an outer vertical wall greater in height than the inner vertical wall.

5. The trailer floor assembly according to claim 3, wherein the fasteners engage a horizontal leg of the right angle member.

6. The trailer floor assembly according to claim 1, wherein the plurality of extruded metal panels are formed of aluminum.

7. The trailer floor assembly according to claim 6, wherein the at least one roll-formed steel panel includes a roll-formed steel panel at a rear end of the trailer floor assembly.

8. The trailer floor assembly according to claim 6, wherein the at least one roll-formed steel panel includes a plurality of adjacent roll-formed steel panels at a front end of the trailer floor assembly.

9. The trailer floor assembly according to claim 1, wherein the front and rear walls of each of the plurality of extruded metal panels include complementary curved portions, whereby the front wall of one extruded metal panel mates with the rear wall of an adjacent extruded metal panel.

10. The trailer floor assembly according to claim 9, wherein one of the complementary curved portions has a recess for defining a gap between the front and rear walls of adjacent extruded metal panels.

11. The trailer floor assembly according to claim 10, wherein the gap is injected with sealant or epoxy.

12. The trailer floor assembly according to claim 1, wherein each of the plurality of extruded metal panels includes at least one internal partition connecting the top wall and the bottom wall, wherein a plurality of internal compartments are defined.

13. The trailer floor assembly according to claim 12, wherein the plurality of internal compartments are filled with foam insulating material.

14. The trailer floor assembly according to claim 12, wherein the at least one internal partition consists of exactly four internal partitions cooperating with the front and rear walls to define exactly five internal compartments.

15. The trailer floor assembly according to claim 1, wherein the top wall of each of the plurality of extruded metal panels includes a plurality of striations on an upper surface thereof.

16. A panel comprising an elongated monolithic body formed of extruded metal, the body including a top wall and a bottom wall connected by a front wall and a rear wall, wherein the bottom wall includes at least one T-shaped slot defining a pair of upwardly facing shoulder surfaces, wherein the T-shaped slot is spaced from the top wall, the panel further comprising at least one internal partition connecting the top wall and the bottom wall, wherein a plurality of internal compartments are defined, and wherein the at least one internal partition consists of exactly four internal partitions cooperating with the front and rear walls to define exactly five internal compartments.

17. The panel according to claim 16, wherein the front and rear walls include complementary curved portions, whereby the front wall of one said panel mates with the rear wall of an adjacent said panel.

18. The panel according to claim 17, wherein one of the complementary curved portions has a recess for defining a gap between the front and rear walls of mated panels.

19. The panel according to claim 16, wherein the plurality of internal compartments are filled with foam insulating material.

20. The panel according to claim 16, wherein the top wall of each of the plurality of extruded metal panels includes a plurality of striations on an upper surface thereof.

* * * * *